April 16, 1963  F. W. HOLST  3,085,633
LAWN EDGER

Filed April 9, 1959  2 Sheets-Sheet 1

*INVENTOR*
FRED W. HOLST

April 16, 1963 F. W. HOLST 3,085,633
LAWN EDGER

Filed April 9, 1959 2 Sheets-Sheet 2

INVENTOR
FRED W. HOLST

United States Patent Office 3,085,633
Patented Apr. 16, 1963

3,085,633
LAWN EDGER
Fred W. Holst, 3111 Cricklewood St., Torrance, Calif.
Filed Apr. 9, 1959, Ser. No. 805,190
4 Claims. (Cl. 172—16)

The present invention consists of an improved lawn edger adapted to vertically edge a lawn or a body of turf along a line inwardly spaced a predetermined distance from the edge of a hard-surfaced, substantially flat medium such as concrete sidewalk, or the like, although not so limited, adjacent the edge of the lawn. It should be noted that one form of the improved lawn edger of the present invention includes wheel means adapted to be forcibly rolled along the sidewalk or other hard-surfaced, substantially flat medium and, as a result thereof, to effectively rotate a plurality of outwardly projecting bidirectionally active severing teeth which will be forcibly moved forwardly, downwardly, and rearwardly (or the opposite) past a plurality of fixed severing teeth so as to provide a very effective shearing action with respect to the edge of the lawn or turf which is to be vertically severed. In other words, the arrangement is such that the lawn edger has a severing action when operated in either direction, and is capable of being very easily and effectively operated by even a relatively weak person such as a woman or a fairly small child. In other words, the improved lawn edger of the present invention is much easier to operate and results in a much faster lawn edging operation than is true of prior art lawn edgers which require the application of great force in order to shear the lawn edge.

It is an object of the present invention to provide an improved lawn edger of the type generally described above including frame means provided with a substantially transverse shaft means rotatably mounted with respect to the frame means and carrying wheel means in fixed relationship with respect to the shaft means whereby forcible movement of said wheel means along a hard-surfaced, substantially flat medium, such as a sidewalk or the like, adjacent the edge of a lawn will cause said shaft means to be rotated with respect to said frame means, further including power transmission means carried by said shaft means adjacent one side of said frame means for rotation by said shaft means and said wheel means, and with said side of said frame means having a longitudinal extension rotatably carrying a second power transmission means, with both of said power transmission means being effectively connected by coupling means whereby rotation of said wheel means as a result of forcibly rolling them along a sidewalk, or the like adjacent the edge of the lawn, will rotate said shaft means, said first power transmission means and said second power transmission means through said coupling means, with said coupling means being provided with a plurality of spaced outwardly directed movable severing teeth lying in a substantially vertical plane immediately laterally adjacent to the plane of said side of the frame means and movable around both of said power transmission means as a result of rotation thereof by forcible movement of said wheel means along a hard-surfaced, substantially flat medium such as sidewalk, or the like, adjacent the edge of the lawn, and with said side of said frame member being further provided along the bottom edge thereof adjacent the front end thereof with a plurality of outwardly, downwardly, and forwardly projecting fixed severing teeth lying in a substantially vertical plane immediately laterally adjacent to the vertical plane in which the plurality of movable severing teeth lie and move, and further including a handle effectively attached with respect to said frame member for operating the entire device by rolling the wheel means along a sidewalk, or the like, adjacent the edge of the lawn, with the movable severing teeth and the fixed severing teeth in shearing engagement with the lawn edge.

It is a further object to provide an improved lawn edger of the type set forth in the preceding object, wherein said teeth have opposed spaced cutting portions adapted for bidirectional lawn cutting movement.

It is a further object to provide an improved lawn edger of the type set forth in either of the preceding objects, including protective cover means mounted over said first and second power transmission means and said coupling means.

It is a further object to provide an improved lawn edger of the type set forth in any of the preceding objects, including controllably operable adjusting and locking means for adjusting said second power transmission means toward and away from said first power transmission means and locking it in a selected adjusted position such as to take up any slack which may exist in said coupling means.

It is a further object to provide an improved lawn edger of the type set forth in any of the preceding objects, wherein the handle member is attached with respect to said frame member by means of a handle attachment member pivotally and controllably lockably connected to said frame means for adjustment about a horizontal axis and adapted to be locked in any selected adjusted position, said handle attachment member having a longitudinal shaft-engageable portion fastened to an attachment end of said handle member.

It is a further object of the present invention to provide an improved lawn edger wherein each of said first and second power transmission means comprises an individual sprocket wheel, and wherein said coupling means comprises sprocket chain means effectively connecting said sprocket wheels.

It is a further object to provide a device of the character set forth in any of the preceding objects, which is of extremely simple, cheap, foolproof, construction such as to be conducive to widespread use of the device.

Further objects will be apparent to persons skilled in the art after a careful study hereof.

For the purpose of clarifying the nature of the present invention, two exemplary embodiments are illustrated in the hereinbelow-described figures of the accompanying two sheets of drawings, and are described in detail hereinafter.

Figure 1:
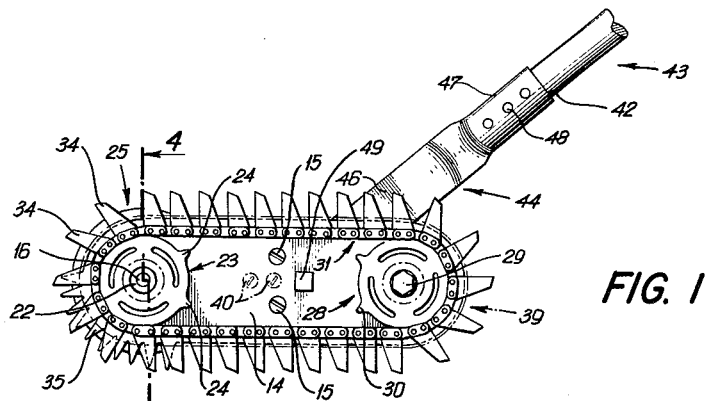
FIG. 1 is a fragmentary reduced-size left side elevational view of one exemplary form of the invention with the protective cover means shown in broken lines only in order to clearly show the portions of the device normally covered thereby.
Figure 2:
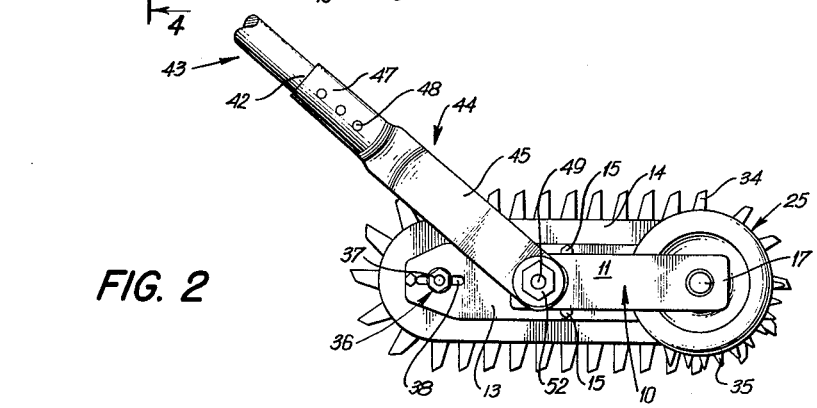
FIG. 2 is a fragmentary reduced-size right side elevational view of the embodiment of the invention illustrated in FIG. 1.

In the specific embodiment of the invention illustrated in FIGS. 1–4, the above-mentioned frame means takes one specific form, indicated generally at 10, wherein it is of generally yoke-shaped configuration and includes a side member 11 and a second composite side member, indicated generally at 12, consisting of an inner plate 13 and an outer plate 14 suitably fastened together by fastening means, indicated at 15, so as to effectively comprise the complete composite left side plate 12 having a rearwardly directed extension 12R, the purpose of which will be described more fully hereinafter. In the specific example illustrated in FIGS. 1–4, the yoke-shaped frame means, indicated generally at 10, is provided with horizontal shaft means 16 having a right end 17 rotatably mounted in the apertured forward end of the side member 11 of the frame means 10, as indicated at 18; said shaft means 16 having its left end rotatably extending through a bearing member 19 carried by the inner plate 13 and extending through an aperture 20 in the outer plate 14 and then being locked by suitable set screw means 21 into the hub portion 22 of a first power transmission means which, in this specific example, takes the form of a first sprocket wheel means, indicated generally at 23, and having a plurality of sprocket teeth 24 circumferentially spaced therearound. It should be noted that the shaft 16, between the right side 11 and the composite left side 12 thereof, carries two wheel means, indicated generally at 25, each of which is fixed to the shaft 16, in the particular example illustrated by being welded thereto as indicated at 26, although keying, set screw fastening, or any other means for fastening the wheel means 25 to the shaft means 16 may be employed. A compression spring means 27 is positioned between the bearing member 19 comprising a part of the inner plate 13 and the left side of the left wheel means 25 whereby to effectively bias the entire shaft 16 carrying both of the wheel means 25 toward the right as viewed in FIG. 4 so as to maintain the sprocket wheel means 23 in closely adjacent relationship against the left side of the outer plate 14.

The rearwardly directed extension 12R of the composite left side 12 of the frame means 10 also rotatively mounts a second power transmission means, which in the example illustrated, takes the form of a second sprocket wheel means, indicated generally at 28, rotatably mounted on pivotal mounting means, indicated at 29, and having a plurality of sprocket teeth 30 circumferentially spaced therearound.

Figure 3:
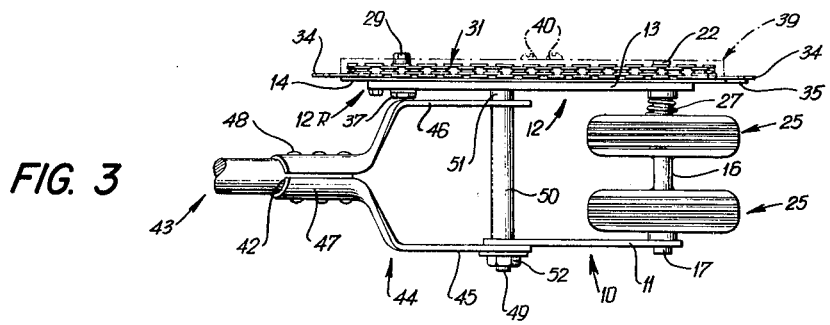
FIG. 3 is a top plan view of FIG. 2.
Figure 4:
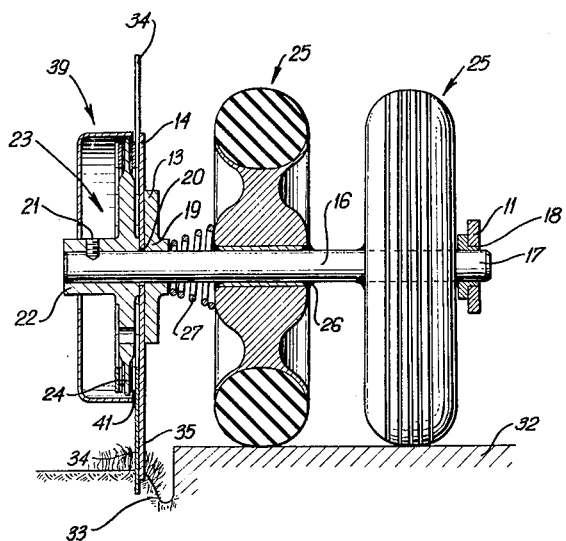
FIG. 4 is a larger scale vertical sectional view of a portion of the complete device taken along a plane such as indicated by the arrows 4—4 of FIG. 1. However, the right hand wheel is shown in elevation since showing it in section would merely be a repetition of the sectional showing of the left wheel.

It should be noted that the hereinbefore-mentioned coupling means connecting the first and second power transmission means takes one specific form in the example illustrated in FIGS. 1–4 wherein it comprises a sprocket chain means, indicated generally at 31, and consisting of a plurality of flexibly end-to-end interconnected links engaged with the sprocket teeth 24 and 30 whereby forcible rotation of the wheel means 25, by forcibly rolling same along a hard-surfaced substantially flat medium such as a sidewalk, or the like, as indicated at 32 in FIG. 4 adjacent the edge of a lawn, as indicated at 33 in FIG. 4, will cause the shaft 16 to rotate the first sprocket wheel means 23 which, through the sprocket chain means 31, will rotate the second sprocket wheel means 28. It will be noted that the rotating sprocket chain means 31 is provided with a plurality of spaced outwardly directed movable severing teeth 34, each of which is mounted to the side of the sprocket chain means 31 closest to the outer plate member 14, whereby rotation of the sprocket chain means 31 in the manner just described will cause the plurality of teeth 34 to move to the left, downwardly, and then rightwardly as viewed in FIG. 1 in closely adjacent and shearing relationship to a plurality of outwardly, downwardly, and forwardly projecting fixed severing teeth, indicated at 35, carried by the outer plate member 14 and lying in a substantially vertical plane immediately laterally adjacent to the vertical plane in which the plurality of movable severing teeth 34 lie and move. Thus it will be seen that the turf or lawn edge shown at 33 in FIG. 4 will be effectively sheared between the edges of the moving teeth 34 and the fixed teeth 35 when the device is moved so that the wheel means 25 are forcibly rolled along the sidewalk 32 as shown in FIG. 4. It should be noted that, in order to facilitate adjustment of the sprocket chain means 31, the rear sprocket wheel means 28 includes controllably operable adjusting and locking means, indicated generally at 36, for adjusting the second sprocket wheel means 28 toward and away from the first sprocket wheel means 23 and locking it in adjusted position so as to take up any slack which may exist in the coupling sprocket chain means 31. This is accomplished by loosening the threaded fastener 37 of the pivotal mounting means 29, shifting the position of the entire second sprocket wheel means 28, as allowed by the longitudinal slot means 38, and then retightening the fastener 37 in the new position.

It should also be noted that in the preferred form illustrated in FIGS. 1–4, protective cover means, as indicated generally in solid lines at 39 in FIG. 4 and in broken lines at 39 in FIGS. 1 and 3, is adapted to be mounted over the first and second sprocket wheel means 23 and 28 and the coupling sprocket chain means 31 and is adapted to be fastened in said position by suitable fastening screw means, such as indicated in broken lines at 40 in FIGS. 1 and 3. It will be noted that the protective cover means 39 has a suitable slot 41 which allows egress at the top and bottom around the entire perimeter of the cover means 39 of the plurality of movable severing teeth 34 so as to not interfere with their operation.

In the specific example illustrated, the frame means, indicated generally at 10, is effectively connected to the attachment end 42 of a handle member, indicated generally at 43, by means of a yoke-shaped handle attachment member, indicated generally at 44, which includes a first or right side member 45, a second or left side member 46, and a longitudinal shaft-engageable portion 47 adapted to be fastened by suitable fasteners 48 to the attachment end 42 of the handle member 43. It should be noted that the side members 45 and 46 are laterally horizontally apertured and pivotally mounted on a longitudinal bolt 49, which also pivotally mounts the right side member 11 and the left composite side member 12 of the frame means 10 on the bolt 49 with intermediate bushing or spacer portions 50 and 51 properly spacing the side members, and with a fastening nut 52 being controllably tightenable on the threaded portion of the bolt 49 so as to very tightly lock the entire yoke-shaped handle attachment member 44 in any desired pivotal relationship with respect to the entire frame means 10, thus providing a very effective pivotally adjustable and controllably lockable arrangement to make possible adjustment of the relationship and angular position of the handle member 43 and the entire operating apparatus at the lower end thereof.

Figure 5:
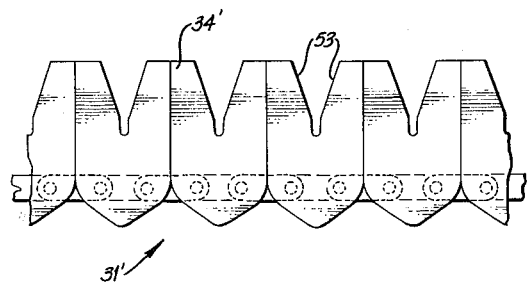
FIG. 5 is a fragmentary enlarged view of a portion of a modified form of the plurality of movable severing teeth having opposed spaced cutting portions adapted for bidirectional lawn edge cutting movement.
Figure 6:
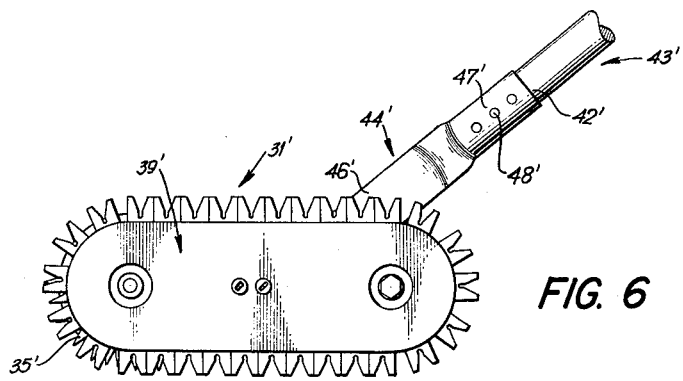
FIG. 6 is a fragmentary left side elevational view very similar to FIG. 1, but shows a modified form of the invention having bidirectional movable severing teeth of the type shown in FIG. 5 and also shows in solid lines the protective cover means in mounted position.

FIGS. 5 and 6 illustrate a slight modification of the first form of the invention and similar parts will be indicated by the same reference numerals, primed. In this modification, each of the plurality of movable severing teeth 34' includes opposed spaced cutting portions 53 adapted for bidirectional lawn edge cutting movement. In other words, with this type of movable severing teeth, the device may be rolled forwardly and backwardly and will effectively shear the grass edge in both directions.

FIG. 6 also shows the protective cover means 39' in solid lines and in normal mounted protecting position.

It should be understood that the figures and the specific description thereof set forth in this application are for the purpose of illustrating the present invention and are not to be construed as limiting the present invention to the precise and detailed specific structure shown in the figures and specifically described hereinbefore.

Rather, the real invention is intended to include substantially equivalent constructions embodying the basic teachings and inventive concept of the present invention.

I claim:

1. A lawn edger comprising, rotatable drive means including a horizontally disposed rotatable drive shaft, an inner plate mounted parallel to said drive means and carried thereby for non-rotatably rectilinear movement therewith, an outer plate mounted on said inner plate for movement therewith and formed with a plurality of depending shearing teeth, a pair of substantially identical sprockets one of which is drivingly connected to said drive shaft and the other of which is rotatably mounted on said outer plate on an axis horizontally spaced from the axis of said shaft, and an endless chain carried by said sprockets and having a plurality of outwardly extending shearing teeth for shearing cooperation with the depending teeth on said outer plate during the lower flight of said chain.

2. A lawn edger comprising drive means including a wheel engageable with a substantially horizontal surface and drivingly connected to a horizontally disposed rotatable drive shaft, an inner plate mounted parallel to said drive means and carried thereby for non-rotatable rectilinear movement therewith, an outer plate mounted on said inner plate for movement therewith and formed with a plurality of depending shearing teeth, a pair of substantially identical sprockets one of which is drivingly connected to said drive shaft and the other of which is rotatably mounted on said outer plate for rotation about horizontally spaced horizontal axes, and an endless chain drivingly carried by said sprockets and having a plurality of outwardly extending shearing teeth for shearing cooperation with the depending teeth on said outer plate during the lower flight of said chain.

3. A lawn edger comprising, rotatable drive means including a horizontally disposed rotatable drive shaft, an inner plate mounted parallel to said drive means and carried thereby for non-rotatable rectilinear movement therewith, an outer plate mounted on said inner plate for movement therewith and formed with a plurality of depending shearing teeth, a pair of substantially identical sprockets one of which is drivingly connected to said drive shaft and the other of which is rotatably mounted on said outer plate on an axis horizontally spaced from the axis of said shaft, an endless chain carried by said sprockets and having a plurality of outwardly extending shearing teeth for shearing cooperation with the depending teeth on said outer plate during the lower flight of said chain, and handle means fixed to said inner plate for actuating said drive means to move said edger along the edge of a lawn and to effect shearing cooperation between the teeth on said outer plate and said endless chain.

4. A lawn edger comprising, rotatable drive means including a horizontally disposed rotatable drive shaft, an inner plate mounted parallel to said drive means and formed with a through opening for receiving said drive shaft whereby said plate is carried by said shaft and is afforded non-rotatable rectilinear movement therewith, an outer plate mounted on said inner plate for movement therewith and formed with a through opening for receiving said shaft, a plurality of depending shearing teeth on said outer plate, a pair of substantially identical sprockets one of which is drivingly mounted on said shaft and the other of which is rotatably mounted on said outer plate in horizontal spaced relation to said drive shaft, and an endless chain drivingly carried by said sprockets and having a plurality of outwardly extending shearing teeth, said sprockets and chain being so constructed and mounted relative to said outer plate as to effect shearing cooperation between the teeth on said chain and the teeth on said outer plate during the lower flight of said chain between said sprockets.

References Cited in the file of this patent

UNITED STATES PATENTS

| 726,392 | Bailey | Apr. 28, 1903 |
|---|---|---|
| 953,876 | Warner | Apr. 5, 1910 |
| 1,073,999 | Matheson | Sept. 23, 1913 |
| 1,765,005 | Diggins | June 17, 1930 |
| 2,488,886 | Young | Nov. 22, 1949 |
| 2,901,878 | Johnson | Sept. 1, 1959 |

FOREIGN PATENTS

| 760,827 | Great Britain | Nov. 7, 1956 |